United States Patent [19]
Huebner

[11] Patent Number: 5,113,207
[45] Date of Patent: May 12, 1992

[54] APPARATUS AND METHOD FOR PHOTOGRAPHING REFLECTIVE OBJECTS

[75] Inventor: Roger F. Huebner, Arlington, Tex.

[73] Assignee: Huebner International, Inc., Norman, Okla.

[21] Appl. No.: 622,042

[22] Filed: Dec. 4, 1990

[51] Int. Cl.⁵ .............................................. G03B 37/00
[52] U.S. Cl. ...................................... 354/94; 354/290; 354/296
[58] Field of Search ........................... 354/94, 290, 296

[56] References Cited

U.S. PATENT DOCUMENTS

| | | | |
|---|---|---|---|
| 2,649,835 | 8/1953 | Lierley | 355/40 |
| 2,860,561 | 11/1958 | Pennington | 355/83 |
| 3,158,478 | 11/1964 | Eaton et al. | 355/80 |
| 3,378,678 | 4/1968 | De Groff | 240/1.3 |
| 3,670,156 | 6/1972 | Schmidt | 240/02 |
| 3,712,978 | 1/1973 | Lowell | 240/1.3 |
| 4,233,647 | 11/1980 | Andersen | 362/16 |
| 4,309,094 | 1/1982 | Bollen | 354/290 X |
| 4,383,287 | 5/1983 | Fette | 362/18 |
| 4,757,425 | 7/1988 | Waltz | 362/18 |
| 4,875,066 | 10/1989 | Rickard | 354/296 |

OTHER PUBLICATIONS

Sinar Bron Product Catalog, p. 53, Fall/Winter 1989.

Primary Examiner—Michael L. Gellner
Attorney, Agent, or Firm—Dunlap, Codding & Lee

[57] ABSTRACT

A mask having a slot therein, which acts as an external camera shutter, thereby limiting the camera's view of the object. The mask is comprised of an apparatus, which moves over and/or around the object, providing selective illumination of the reflective object during the photography. Also, a method for photographically recording one or more images of a reflective object on film while limiting the camera's view of the object and while selectively illuminating the object.

19 Claims, 3 Drawing Sheets

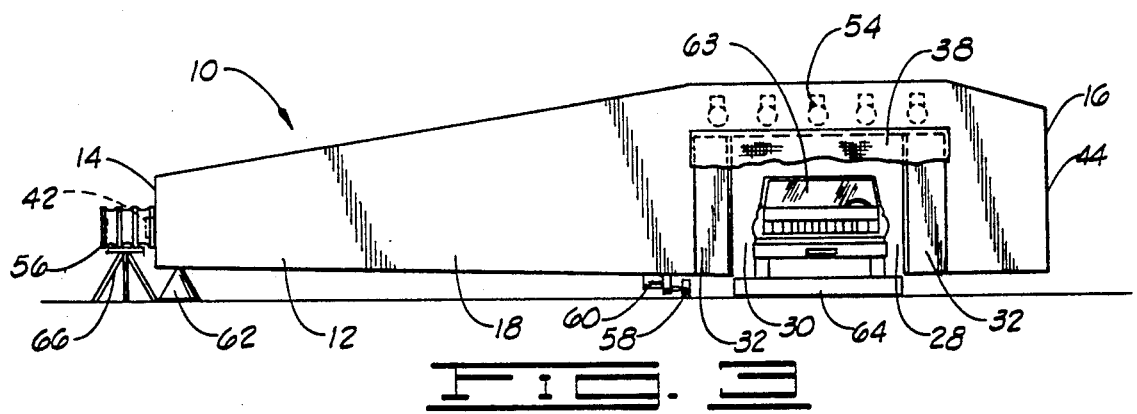
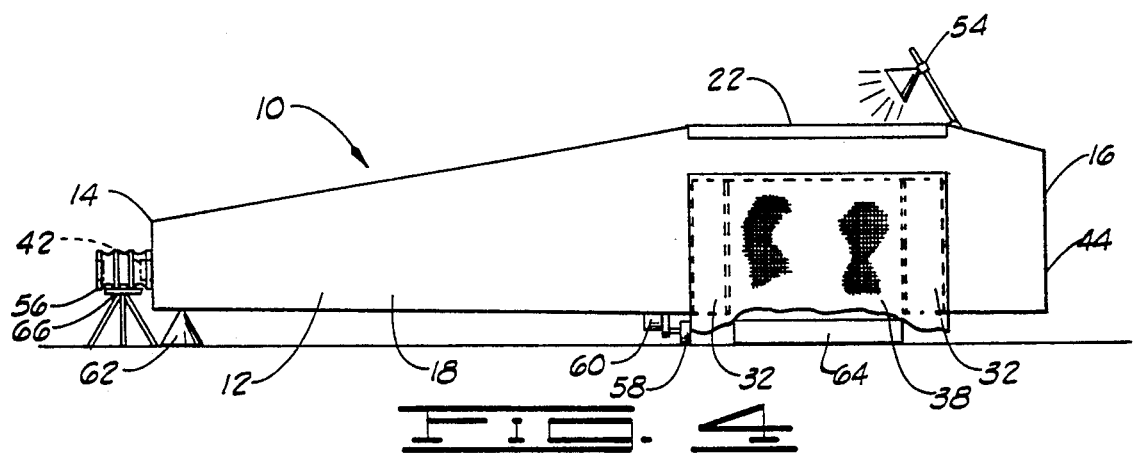
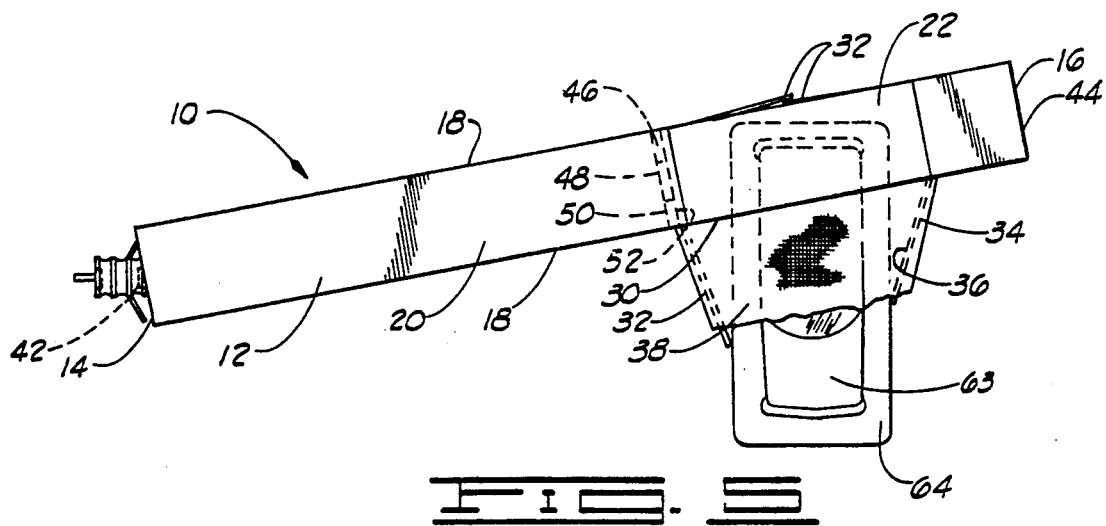

5,113,207

APPARATUS AND METHOD FOR PHOTOGRAPHING REFLECTIVE OBJECTS

BRIEF SUMMARY OF THE INVENTION

1. Field of the Invention

This invention relates to improvements in devices and methods for photographing reflective objects.

2. Background of the Invention

Reflective objects, such as automobiles, have traditionally been difficult to photograph, due to their highly mirrored, irregular surfaces. Because of their reflectivity, certain portions of the objects are frequently excessively illuminated or under-illuminated. Compounding this difficulty is the ability of these objects to pick up unwanted reflections from other objects nearby. Up to the present time, a totally acceptable apparatus and method which would eliminate these drawbacks has not been available.

The object of this invention is to provide an apparatus and a method whereby control is obtained of both selective illumination of the reflective object and of the light reflecting therefrom, allowing optimal photographic images of the object to be recorded on film. This control is attained by allowing the camera to view the object through a slot in the apparatus. The apparatus and slot therein act as a camera shutter. This shutter is external and separate, however, from the camera. In fact, this external camera shutter is normally closer to the object being photographed than it is to the camera. In addition, control is obtained by selectively moving the apparatus over and/or about the object, thereby controlling all surfaces surrounding the object during the photography, while simultaneously controlling the camera's view of the object.

While in the apparatus, certain portions of the object are selectively illuminated. Some portions of the object will be optimally illuminated, while others may be either excessively lighted or in shadows. The amount of the object that the camera is allowed to view is controlled via the slot in the apparatus, which acts as an external camera shutter. Thus, the camera is allowed to view only a selected portion of the object at any one time. Preferably, the apparatus is moved over and/or about the object in a controlled manner while the slot allows the optimally illuminated portion of the object to be recorded on film.

Thereafter, different sections of the object may be selectively illuminated, while the apparatus is again moved over and/or around it, providing the camera with additional images of the object which are superimposed over the previous images. In this manner, the final picture comprises a composite of images of the reflective object.

BRIEF DESCRIPTION OF THE DRAWINGS

FIG. 3 is a schematic side view of the hollow tunnel apparatus of FIG. 1 illustrating on type of internal illumination.

FIG. 4 is a schematic side view of the hollow tunnel apparatus of FIG. 1 illustrating an alternative type of illumination.

FIG. 5 is a schematic plan view of the hollow tunnel apparatus of FIG. 1 illustrating the pivotal movement of the apparatus over an object received therethrough.

DETAILED DESCRIPTION OF THE DRAWINGS

The First Preferred Embodiment

Figure 1:
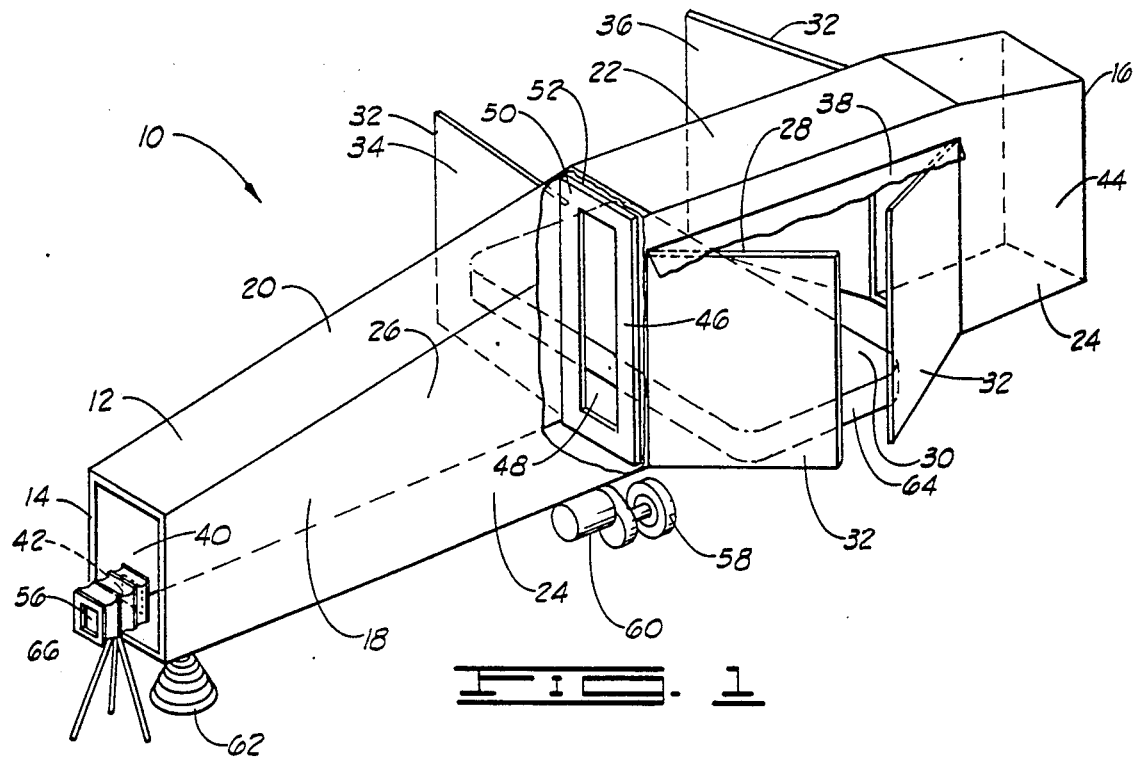
FIG. 1 is a schematic perspective view of a hollow tunnel apparatus constructed in accordance with this invention.
Figure 2:
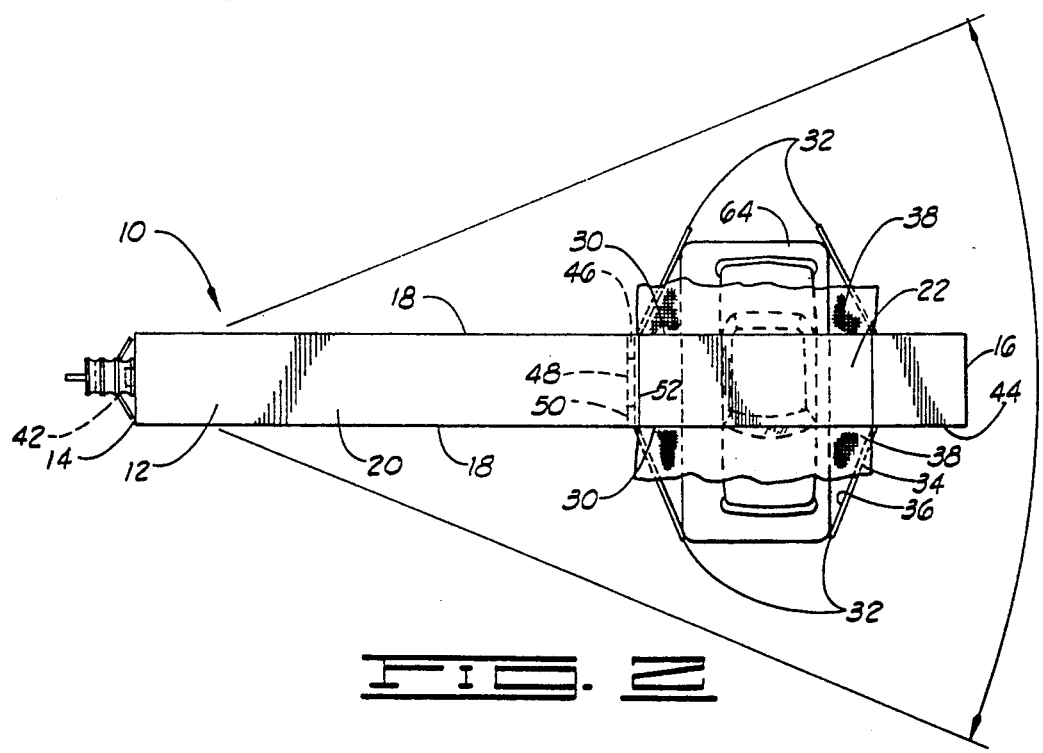
FIG. 2 is a schematic plan view of the hollow tunnel apparatus of FIG. 1 with an illustration of the arcuate movement of the apparatus over an object received therein.

Referring to the drawings in detail, and particularly to FIGS. 1 and 2, reference character 10 generally designates an apparatus constructed pursuant to the invention. The apparatus 10 includes a hollow tunnel 12 having a first open end 14, a second closed end 16, two lateral sections 18, a first upper portion 20 and a second upper portion 22, a lower portion 24, and a first interior chamber 26 and a second interior chamber 28.

The two lateral sections 18 and the lower portion 24 of the tunnel 12 have contiguous openings 30. Doors 32 are pivotally mounted on either side of openings 30 in each lateral section 18 of the tunnel 12, which swing outward to receive a reflective object therethrough. The doors 32 each have an exterior side 34 and a reflective interior side 36, as illustrated in FIG. 1. Attached to the top of openings 30 and to the upper portion of each of the doors 32 on each lateral section 18 is non-reflective netting 38, which is used to control extraneous light from entering the interior of the tunnel 12, as shown in FIGS. 2, 4 and 5. The netting 38 preferably extends completely over the reflective object as it enters and leaves the tunnel 12 (not shown).

The first upper portion 20 of the tunnel 12 is made of a material which will not allow light to enter the first interior chamber 26 of the tunnel 12, as shown in FIGS. 1, 3 and 5, and the second upper portion 22 can be made of the same material. Alternatively, the second upper portion 22 can be made of a translucent material, as illustrated in FIG. 4, which allows light to diffuse therethrough, thereby providing illuminating to the second interior chamber of the tunnel 12. The lower portion 24 of the tunnel 12 is also made of a non-translucent material, as shown in FIG. 1. The passage of lower portion 24 down the length of the tunnel 12 is interrupted by openings 30.

Referring now to FIG. 1, the tunnel 12 is characterized at the first end 14 by opening 40. Opening 40 is sized to allow a camera 42 to view the reflective object in the tunnel 12 while the tunnel 12 is passed thereover. The tunnel 12 expands outward from its smallest cross section at first end 14 into a greater cross section. At its cross section diameter, at the second interior chamber 28, the tunnel 12 is sized to allow a large reflective object, such as an automobile, to be received therethrough, in a manner which will be discussed below. The second end 16 of the tunnel 12 is a solid end wall 44, and along with lateral sections 18 and the remaining lower portion 24, act as a background with respect to the reflective object photographed in the second interior chamber 28.

The interior of the tunnel 1 is divided into the two chambers 26 and 28 by a partition 46 having a slot 48 therein. The first chamber 26 extends from the first end 1 4 of the tunnel 12 to the partition 46. The partition 46 is located in a perpendicular relationship to lateral sections 18, forming an interior wall in the tunnel 12, which separates the hollow tunnel 12 into the first chamber 26 and the second chamber 28. The resulting first interior chamber 26 is characterized as non-reflective, providing the camera 42, positioned directly in front of opening 40 at the first end 14 of the tunnel 12, with a view of the reflective object in the illuminated second chamber 28 through the slot 48 in the partition 46. Thus, the interior surface of the first chamber 26, including the partition 46, functions as a mask. The slot 48 is thereby characterized as an external camera shutter, as will be described further below.

The second interior chamber 28 is comprised of the space between partition 46, the second upper portion 22, a portion of the lateral sections 18, openings 30 and doors 32 attached to each side of the lateral sections 18, solid end wall 44, and the second end 16. Illumination in the chamber 28 is distributed over the reflective object therein via the reflective color of the interior walls of the lateral sections 18 and the interior sides 36 of doors 32 attached thereto.

The partition 46 has a nonreflective first side 50, which faces the first interior chamber 26 and a second side 52 which faces the second interior chamber 28, which is characterized as a light-controlling reflector with respect to the reflective object being photographed therein. The second end 16 of the tunnel 12, end wall 44 and remaining lower portion 24 act as a background for the reflective object. It will be appreciated that the background may be controlled and selectively altered for the photography.

Illumination to the second chamber 28 is provided by lights 54 mounted below the second upper portion 22, as illustrated in FIG. 3. In the alternative, the chamber 28 may be illuminated by lights 54 mounted to the external section of the second upper portion 22, as illustrated in FIG. 4. In this embodiment, the second upper portion 22 is made of a translucent material which allows the light to be diffused through the second upper portion 22.

Referring now to FIGS. 3 and 4, the second interior chamber 28 may be illuminated by a plurality of lights 54. The lights 54 provide selective highlighting, namely, greater illumination upon selected surfaces of the reflective object. The lights 54 also provide selective lowlighting, namely, decreased illumination upon selected areas of the reflective object. The lights 54 provide photographic control over contours of the reflective object which are recorded by the film 56 of the camera 42, providing enhancement of some portions of the reflective object and simultaneously, or alternatively, providing diminution of other portions, in a manner to be described below. Further, it should be appreciated that a variety of light sources, as well as a variety of light colors, may be chosen for the selective illumination of the object within the tunnel 12. Moreover, the illumination of the reflective object while in the tunnel 12 may be remotely controlled (not shown).

The tunnel 12 has a plurality of wheels 58 which are driven by a variable speed motor 60, as shown in Figs. 1 and 3, and remote control thereof (not shown). The first end 14 of the tunnel 12 is pivotally engaged to a non-movable base 62, such that the second end 16 may move in a selectively controlled arcuate path, as illustrated in FIGS. 2 and 5.

As shown in FIGS. 1, 2 and 5, the reflective object 63 may be placed on a ramp 64, while the tunnel 12 moves in an arcuate path, and the reflective object 63 is received into and out of the second interior chamber 28 of the tunnel 12 via openings 30 in the lateral sections 18 and the doors 32 attached thereto. The doors 32 and the netting 38 limit the amount of external light emitted into the second interior chamber 28 as the tunnel 12 receives and moves over the reflective object 63. The tunnel 12 is moved at a selectively controlled and variable rate of speed. Further, it should be appreciated that the tunnel 12 may be moved over the reflective object 63 in a first direction or a second direction. Thus, the movement of the tunnel 12 is characterized by selective movement at variable speed in one or both directions during the photography of the reflective object 63. Speed and direction of the tunnel 12 may be controlled by remote control (not shown).

Turning now to the method of the invention, the partition 46 located between the first and second interior chambers 26 and 28 of the tunnel 12 acts as an external camera shutter during the photography of the reflective object 63, and limits the view of the camera 42 to only a selected portion of the object 63 at any one time, as the object 63 passes (relatively) through the second interior chamber 28. The internal shutter 66 of the camera 42 is opened, and the camera 42 is set at the first end 14 of the tunnel 12 to view the reflective object 63 in the second interior chamber 28 through the slot 48 in the partition 46. The slot 48 provides the camera 42 a view of only a portion of the reflective object 63 at any one time. However, as the tunnel 12 passes over the reflective object 63, each segment of the object 63 that the camera 42 views will be recorded on the film 56. Thus, after the tunnel 12 has passed over the object 63, the camera 42 will have seen the complete object 63 and will have recorded it on the film 56.

Further, the camera 42 views the reflective object 63 at a time when the light upon the reflective object 63 is not influenced by any extraneous light. That is, the camera 42 is allowed to see a limited portion of the reflective object 63 while it is in the second interior chamber 28, and while the object 63 is optimally and selectively highlighted and lowlighted therein as the tunnel 12 passes thereover. Further, it should be appreciated that the slot 48 in the partition 46 is not limited to a particular shape to provide the camera 42 with a limited view. Any number of shapes for the slot 48 may be utilized, each allowing an enhancement of a certain limited portion of the reflective object 63 during the photography.

Moreover, it will be appreciated that the internal shutter 66 of the camera 42 may remain open, and the tunnel 12 may be passed over the reflective object 63 one or more times, each time with a variation of the illumination upon the object 63. In addition, the size of the slot 48 in the partition 46 may be changed after each passage. In this manner, each image of the reflective object 63 is superimposed upon the previous one, while the internal shutter 66 of the camera 42 is open. When the desired images have been recorded on the film 56 the internal shutter 66 of the camera 42 is closed, thereby preventing any other images upon the film 56. Thus, the final picture recorded on the film 56 is a composite of one or more images of the reflective object 63. The camera 42 and internal shutter 66 may be controlled via remote control (not shown).

The Second Preferred Embodiment

Figure 6:
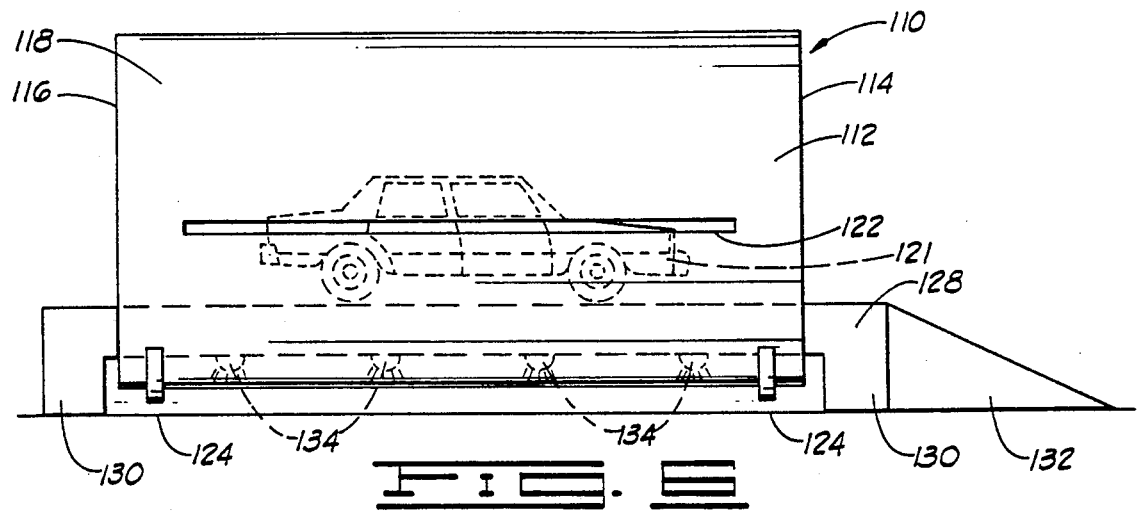
FIG. 6 is a schematic side view of a hollow cylinder apparatus in accordance with the second embodiment of the present invention.
Figure 7:
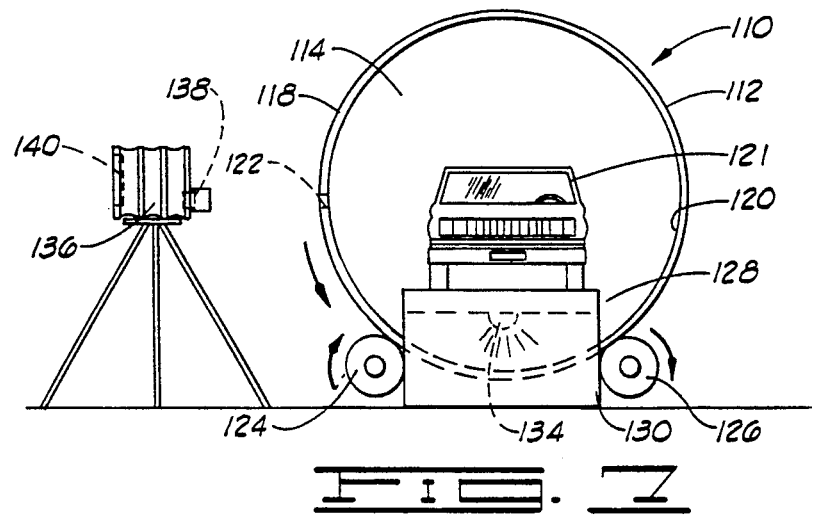
FIG. 7 is a schematic perspective from one end of the hollow cylinder apparatus of FIG. 6.

Referring now to FIGS. 6 and 7, reference character 110 generally designates a second embodiment of the apparatus constructed pursuant to the invention. The apparatus 110 is comprised of a hollow cylinder 112 having a first end 114, a second end 116, a non-reflective external surface 118, and a reflective internal surface 120. The cylinder 112 is sized to receive a large reflective object 121, such as an automobile, therethrough, as illustrated. The cylinder 112, which functions as a mask, has a horizontally extending slot 122 at least as long as the object 121 to be photographed.

The cylinder 112 rests upon a plurality of rotating wheels 124, driven by one or more motorized drives 126. A trestle 128 is received through the cylinder 112 and rests upon dual nonmovable bases 130. Engaged to at least one side of the trestle 128 is a ramp 132. Both trestle 128 and ramp 132 are sized to allow a large reflective object 121 to be placed thereon, and moved to the section of the trestle 128 which is inside the cylinder 112.

A plurality of lights 134 are mounted to and aligned such as under the trestle 128, and illuminate the reflective interior surface 120 of the cylinder 112 and the reflective object 121 therein. Doors or other means (not shown) may be used at both the first end 114 and the second end 116 of the cylinder 112 to limit the amount of extraneous light entering the interior portion 120 thereof. A portion of the interior surface 120 of the cylinder 112 forms a background for the photography. It should be appreciated that the background may be controlled and selectively altered for the photography.

The cylinder 112 is rotated at a selectively controlled variable rate of speed around the reflective object on the trestle 128. Further, the cylinder 112 may be rotated in either a clockwise or counterclockwise direction. Therefore, the cylinder 112 may be rotated at variable speeds and in both a clockwise and counterclockwise direction during the photography of the reflective object 121. The speed and rotational direction of the cylinder 112 may be remotely controlled (not shown).

The reflective object may be selectively highlighted and lowlighted, as described in the first embodiment, thus providing selective illumination to certain portions of the object. Further, a variety of light sources, as well as a variety of light colors, may be chosen for the selective illumination of the object 121 within the cylinder 112. Moreover, the illumination of the interior surface 120 of the cylinder 112 and the reflective object 121 therein may be remotely controlled (not shown).

Turning now to the method of the invention, a camera 136 is positioned outside of the cylinder 112, as illustrated in FIG. 7. A reflective object 121, such as the automobile shown, is driven onto the trestle 128 and into the cylinder 112. The internal shutter 138 of the camera 136 is opened, the reflective object is viewed by the camera 136 through the slot 122 in the cylinder 112, which acts as an external camera shutter and limits the amount of the reflective object 121 viewed by the camera 136 at any one time. Further, it should be appreciated that the slot 122 in the cylinder 112 is not limited to a particular shape to provide the camera 136 with a limited view. Any number of shapes for the slot 122 may be utilized, each allowing an enhancement of a certain limited portion of the reflective object 121 during the photography.

The cylinder 112 is rotated, as described above, while the reflective object 121 is selectively illuminated. The camera 136 is spaced apart from the cylinder 112 and the internal shutter 138 of the camera 136 opened to receive the image of the reflective object 121 on the film 140 therein. The cylinder 112 is rotated over the reflective object 121, and each segment of the object 121 is then viewed by the camera 136 through the slot 122 and recorded on the film 140. Therefore, after the cylinder 112 has rotated over the reflective object 121, the camera 136 will have viewed and recorded on film 140 the complete object 121.

Moreover, it should be appreciated that the internal shutter 138 of the camera 136 may remain open, and the cylinder 112 may be rotated over the reflective object 121 one or more times, each time with a variation in the illumination upon the object 121. In addition, the size of the slot 122 may be altered after each rotation. In this manner each image of the reflective object 121 is superimposed upon the previous one, while the internal shutter 138 of the camera 136 is open. When the desired images have been recorded on the film 140, the internal shutter 138 of the camera 136 is closed, thereby preventing any other images upon the film 140. Thus, the final picture recorded on the film 140 may be a composite of one or more images of the reflective object 121. The camera 136 and the internal shutter 138 may be controlled by remote control (not shown).

The Third Preferred Embodiment

Figure 8:
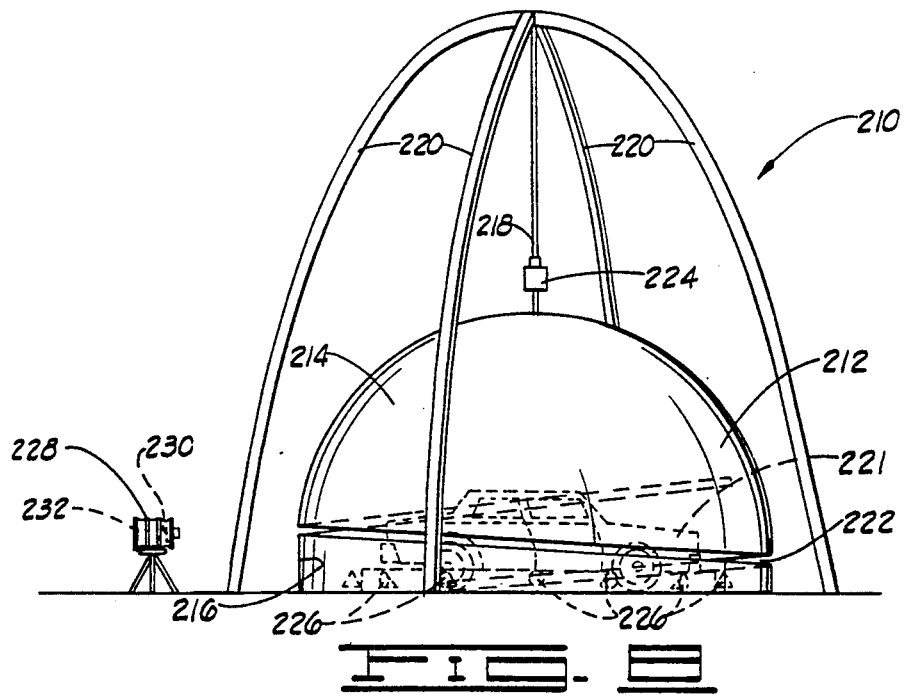
FIG. 8 is a schematic side view of a dome apparatus in accordance with a third embodiment of the present invention.

Referring now to FIG. 8, reference character 210 generally designates a third embodiment of an apparatus constructed pursuant to the invention. The apparatus 210 is comprised of a hollow dome 212 having a non-reflective external surface 214, and a reflective internal surface 216. Secured to the dome 212 and arising from its apex is a tubular extension 218. The tubular extension 218 extends upward from the dome 212, and rigidly engages a plurality of ribs members 220, which extend outward and downward therefrom to rigidly engage the ground, thus providing a supporting framework for the dome 212. The dome 212 is sized to receive a large reflective object 221, such as an automobile, therein as illustrated. The dome 212, which functions as a mask, has a helical slot 222 therein.

The dome 212 is rotatably supported by the tubular extension 218 and ribs members 220. In the alternative, the perimeter of the dome 212 is rotatably supported by a plurality of wheel members (not shown). The dome 212 is rotatably driven by a drive motor 224, which engages the tubular extension 218 at the junction of the tubular extension 218 and the rib members 220, thereby causing a rotation of the tubular extension 218 and the dome 212 engaged therewith.

A plurality of lights 226 are aligned around the periphery of the interior surface 216 of the dome 212, and illuminate the reflective interior portion 216 of the dome 212, and the reflective object 221 therein. A suitable opening in the dome 212 (not shown) is provided to allow receipt of a reflective object 221, such as an automobile, therein. Netting or other means (not shown) are used to limit the amount of extraneous illumination entering the interior portion 216 of the dome 212 from the opening. In the alternative, the dome 212 may be raised upward along the tubular extension 218, thereby allowing a reflective object to be received underneath.

The dome 212 is rotated at a selectively controlled variable rate of speed around the reflective object 221 therein. Further, the dome 212 may be rotated in either a clockwise or counterclockwise direction. Therefore, the dome 212 may be rotated at variable speeds and in both a clockwise and counterclockwise direction during the photography of the reflective object 221. The speed and rotational direction of the dome 212 may be remotely controlled (not shown).

The reflective object 221 is selectively highlighted and lowlighted in the dome 212, as previously described in the first embodiment, thus providing selective illumination to certain portions of the object 221. Further, a variety of light sources, as well as a variety of light colors, may be chosen for the selective illumination of the reflective object 221 within the dome 212. Moreover, the illumination of the interior portion 216 of the dome 212 may be remotely controlled (not shown).

Turning now to the method of the invention, a camera 228 is positioned outside of the dome 212, as illustrated in FIG. 8. A reflective object 221, such as the automobile shown, is moved into the dome 212 in a manner previously described. The internal shutter 230 of the camera 228 is opened, allowing the camera 228 to view the reflective object 221 through the helical slot 222 in the dome 212. The slot 222 acts as an external camera shutter and limits the amount of the reflective object 221 seen by the camera 228 at any one time. Further, it should be appreciated that the slot 222 in the dome 212 is not limited to a particular shape to provide the camera 228 with a limited view. Any number of shapes for the slot 222 may be utilized, each allowing an enhancement of a certain limited portion of the reflective object 221 during the photography.

The dome 212 is rotated, as previously described, while the reflective object 221 is selectively illuminated. The camera 228 is spaced apart from the dome 212 and the internal shutter 230 of the camera 228 opened to receive the image of the reflective object 221 on the film 232 therein. The dome 212 is rotated around the reflective object 221, and each segment of the object is viewed by the camera 228 through the helical slot 222 and recorded on the film 232. Therefore, after the dome 212 has rotated around the reflective object, the camera 228 will have viewed and recorded on film 232 the complete object 221 through the slot 222.

Moreover, it should be appreciated that the internal shutter 230 of the camera 228 may remain open, and the dome 212 may be rotated around the reflective object 221 one or more times, each time with a variation of the illumination upon the object 221. In addition, the size of the slot 222 may be altered after each rotation. In this manner, each image of the reflective object 221 is superimposed upon the previous one, while the internal shutter 230 of the camera 228 is open. When the desired images have been recorded on the film 232, the internal shutter 230 of the camera 228 is closed. Thus, the final picture recorded on the film 232 is a composite of one or more images of the reflective object 221. The camera 228 and the internal shutter 230 may be controlled by remote control (not shown).

Changes may be made in the combination and arrangement of parts or elements as heretofore set forth in the specification and shown in the drawings without departing from the spirit and scope of the invention as defined in the following claims.

What is claimed is:

1. An apparatus adapted for use with a camera for photographing a reflective object, comprising:
   a camera;
   a mask between the camera and the object being photographed;
   a slot in the mask providing a view to the camera of only a portion of the object being photographed in any position of the mask; and
   means for moving the mask with respect to the object being photographed during the photographic recording, whereby the slot is moved across the object being photographed and the mask functions as an external camera shutter.

2. The apparatus as defined in claim 1, wherein the mask is a portion of a hollow tunnel.

3. The apparatus as defined in claim 2 wherein the hollow tunnel includes two lateral sections with parallel openings therein located on the side of the mask remote from the camera.

4. The apparatus as defined in claim 3 wherein the two lateral sections of the hollow tunnel are also characterized by side doors which attach to the external portion of each side of each opening in each lateral section.

5. The apparatus as defined in claim 1 wherein the mask having a slot is characterized by a portion of a hollow tunnel having a partition extending across the tunnel with a slot located therein.

6. The apparatus as defined in claim 2 wherein the hollow tunnel is further characterized as having an upper portion adjacent said openings, wherein sunlight is diffused through the upper portion to provide illumination of the reflective object.

7. The apparatus as defined in claim 2 wherein the hollow tunnel is also characterized as having at least one artificial light source means, wherein the artificial light source means selectively illuminates certain portions of the reflective object.

8. The apparatus as defined in claim 2 wherein the hollow tunnel has a first end and a second end, and characterized further to include:
   a base pivotally supporting the first end of the tunnel, and means for moving the second end of the tunnel in an arcuate path with respect to the base.

9. The apparatus as defined in claim 8 wherein the reflective object is received through the hollow tunnel, as the second end of the hollow tunnel moves in an arcuate path over and around the reflective object during the photography.

10. The apparatus as defined in claim 9 wherein means for moving the second end of the hollow tunnel moves the second end of the tunnel at a variable rate in either a first direction or a second direction.

11. The apparatus as defined in claim 1 wherein the mask is defined as a hollow cylinder having a slot therein.

12. The apparatus as defined in claim 11 wherein the hollow cylinder is further characterized as having at least one light source means, wherein the light source means selectively illuminates certain portions of the reflective object.

13. The apparatus as defined in claim 11 characterized further to include means for moving the cylinder at a variable rate in either a first direction or a second direction around the reflective object.

14. The apparatus as defined in claim 1 wherein the mask is defined as a dome having a slot therein.

15. The apparatus as defined in claim 14 characterized further to include at least one light source, wherein the light source selectively illuminates certain portions of the reflective object therein.

16. The apparatus as defined in claim 14 characterized further to include means for moving the dome at a variable rate in either a first direction or a second direction around the reflective object.

17. A method for use with a camera for photographing reflective objects, which comprises:

placing a mask between the camera and an object being photographed;

photographically viewing only a portion of the object being photographed through a slot in the mask while the mask is in any one position;

moving the mask with respect to the object being photographed, whereby the slot is moved across the object being photographed and the mask functions as an external camera shutter; and photographically recording each incomplete view of the object through the slot in the mask wherein each incomplete view of the object is combined on the film to form a complete picture of the object.

18. The method defined in claim 17 wherein the mask having a slot therein is moved at variable speeds and directions over and around the object during the photography.

19. The method defined in claim 17 wherein each incomplete view of the object of the photography is characterized by selective illumination thereof.

* * * * *